United States Patent [19]
Middelberg et al.

[11] Patent Number: 5,806,659
[45] Date of Patent: Sep. 15, 1998

[54] CHAIN APPARATUS FOR HIGH-SPEED MEDIA PROCESSING

[75] Inventors: Neal J. Middelberg, Apex, N.C.; Daniel C. Park, West Linn, Oreg.

[73] Assignee: Bell and Howell Mail Processing Systems, Durham, N.C.

[21] Appl. No.: 731,725

[22] Filed: Oct. 18, 1996

[51] Int. Cl.$^6$ .................................................. D65G 19/24
[52] U.S. Cl. .......................................... 198/731; 198/733
[58] Field of Search ..................................... 198/731, 733

[56] References Cited

U.S. PATENT DOCUMENTS

| 1,226,156 | 5/1917 | Wilson | 198/733 |
|---|---|---|---|
| 4,441,605 | 4/1984 | Ronco et al. | 198/733 |
| 4,950,398 | 8/1990 | Wiegand et al. | 198/733 |

FOREIGN PATENT DOCUMENTS

| 593856 | 3/1960 | Canada | 198/731 |

*Primary Examiner*—Joseph E. Valenza
*Attorney, Agent, or Firm*—Jenkins & Wilson, P.A.

[57] ABSTRACT

A lightweight chain apparatus is provided for rotation in a high-speed media processing apparatus for particularly causing media to be conveyed. The chain apparatus includes a plastic chain having a series of substantially parallel rollers maintained in a spaced-apart relationship by a series of interconnected link plates positioned on opposing ends of the rollers wherein the rollers and the link plates are constructed of different materials. One or more push members are mounted on the chain for engaging and conveying media, and each push member includes opposing substantially parallel push plates attached substantially perpendicularly to opposing ends of at least a pair of the rollers so as to link the pair of rollers. Each push member forms a laterally extending portion which can be supported against adjacent link plates of the chain for increased stability and longer life when the push member encounters media to be conveyed.

8 Claims, 3 Drawing Sheets

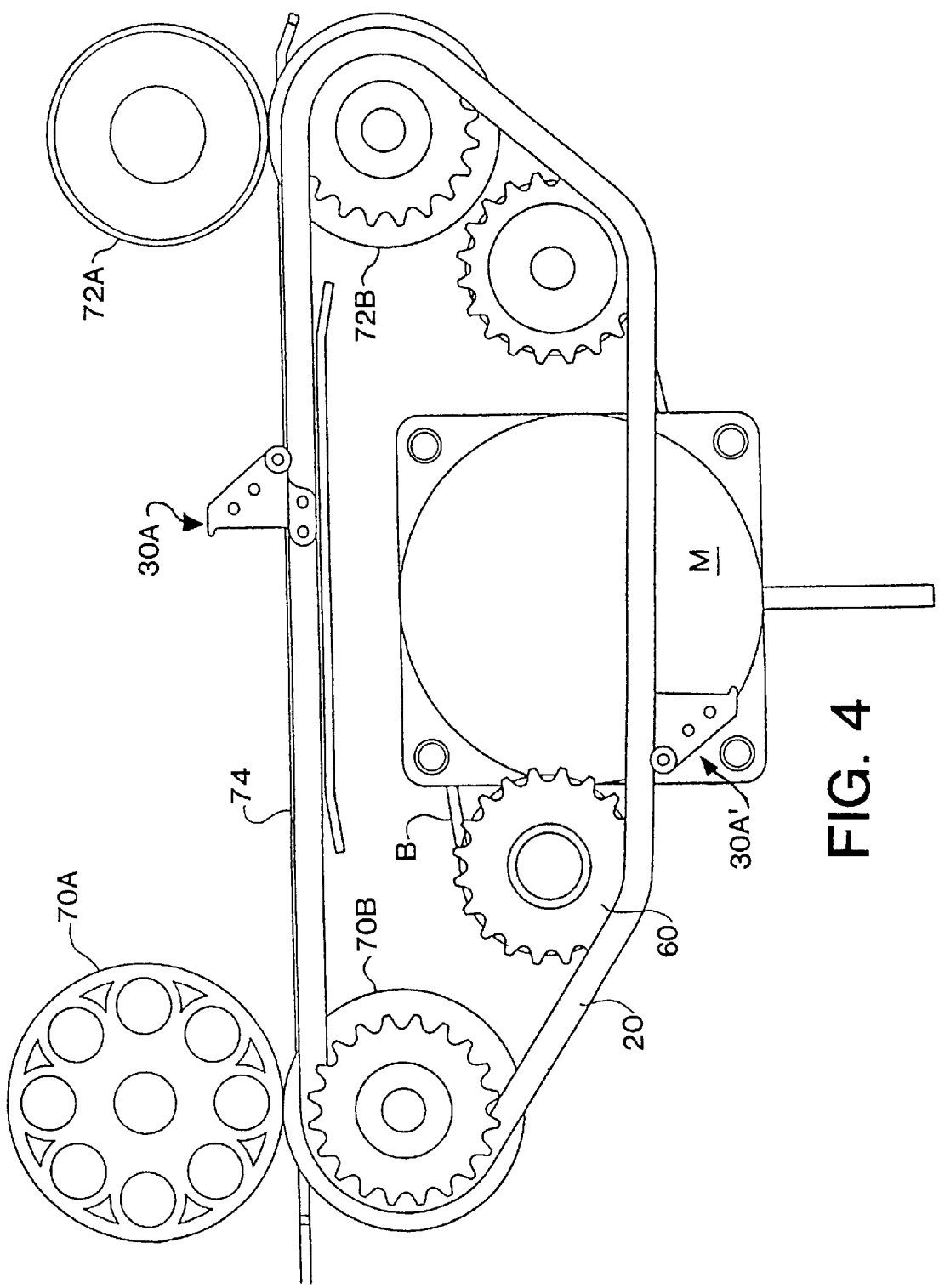

CHAIN APPARATUS FOR HIGH-SPEED MEDIA PROCESSING

TECHNICAL FIELD

The present invention relates generally to apparatuses for high-speed media processing. More particularly, the present invention relates to a lightweight chain apparatus for rotation in a high-speed media processing apparatus to cause media to be conveyed in a predetermined direction.

RELATED ART

It has in the past been common for high-speed media processing apparatuses to utilize a belt with one or more push members of some type attached thereto for causing media to be conveyed along a predetermined path. One apparatus used in the past utilizes a timing belt constructed of neoprene with screw-on push members or lugs attached thereto to push or transport folded sheets of paper during high-speed media processing. An electro-magnetic clutch/brake combination is used to control the motion of the timing belt. As known to those of skill in the art of high-speed media processing, the motion of such a timing belt is typically slow, the timing belt breaks very frequently with continued use, and the clutch/brake system ultimately wears out. Such a timing belt is also usually very difficult to replace since it is a closed loop and typically requires some disassembly of the machine for replacement. Additionally, metal chains with steel push pins or have been used in media transport applications, but due to their inherent weight and the weight of the gears or sprockets used to drive them, they severely limit the speed at which media can be processed and reduce the ability to precisely control the motion of the media.

In light of the prior art apparatuses utilized for conveying media during high-speed media processing such as the one described hereinabove, there exists much room for improvement in the art of high-speed media processing for a chain apparatus for rotation during high-speed media processing to cause media to be conveyed. The lightweight chain apparatus provides significant advantages over prior art high-speed media processing apparatuses.

DISCLOSURE OF THE INVENTION

A lightweight chain apparatus is provided for rotation in a high-speed media processing apparatus. The chain apparatus typically is utilized to cause media to be conveyed and comprises a plastic chain comprising a series of substantially parallel rollers maintained in a spaced-apart relationship by a series of interconnected link plates positioned on opposing ends of the rollers. The rollers and the link plates are preferably constructed of different plastic materials suitable for the chain apparatus to be advantageously practical for use in a high-speed media processing apparatus. Because the chain apparatus is composed of lightweight plastic material, the component that drives the chain can also be made of lightweight material, such as plastic, further increasing the speed and control capabilities with no degradation in the life of the mechanism.

One or more push members can be mounted on the chain for engaging and conveying media, and each push member comprises opposing substantially parallel push plates attached substantially perpendicularly to opposing ends of at least a pair of the rollers of the chain so as to link the pair of rollers. Each of the push plates forms a laterally extending portion which defines a support surface for extending over and engaging an adjacent link plate such that the support surfaces of each push member can provide support to the push member when it encounters media to be conveyed during high-speed media processing.

It is therefore an object of the present invention to provide a novel lightweight chain apparatus for rotation in a high-speed media processing apparatus, particularly for causing media to be conveyed.

It is another object of the present invention to provide a chain apparatus for high-speed media processing which can be driven at high acceleration and speed with minimal wear and long life.

It is a further object of the present invention to provide a chain apparatus for high-speed media processing that includes push members mounted on a chain for engaging and conveying media wherein the push members are attached to the chain like the link plates of the rest of the chain and can therefore be quickly installed on the chain without utilizing tools.

It is still a further object of the present invention to provide a chain apparatus for high-speed media processing including a chain having push members thereon that can be supported against adjacent portions of the chain for increased stability and extended chain life when the push members encounter media to be conveyed.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 4 of the drawings is a schematic side view of a chain apparatus of the present invention utilized for high-speed media processing.

BEST MODE FOR CARRYING OUT THE INVENTION

Referring to the figures of drawings, a chain apparatus generally designated 10 is provided in accordance with the present invention for use in high-speed media processing and is particularly suitable for use during high-speed media processing to convey media such as envelopes, envelope inserts including, for example, folded sheets of paper, and other suitable media typically processed at high speeds. Chain apparatus 10 can therefore be utilized with various types of media as will be suitable and desirable under the circumstances.

Figure 1:
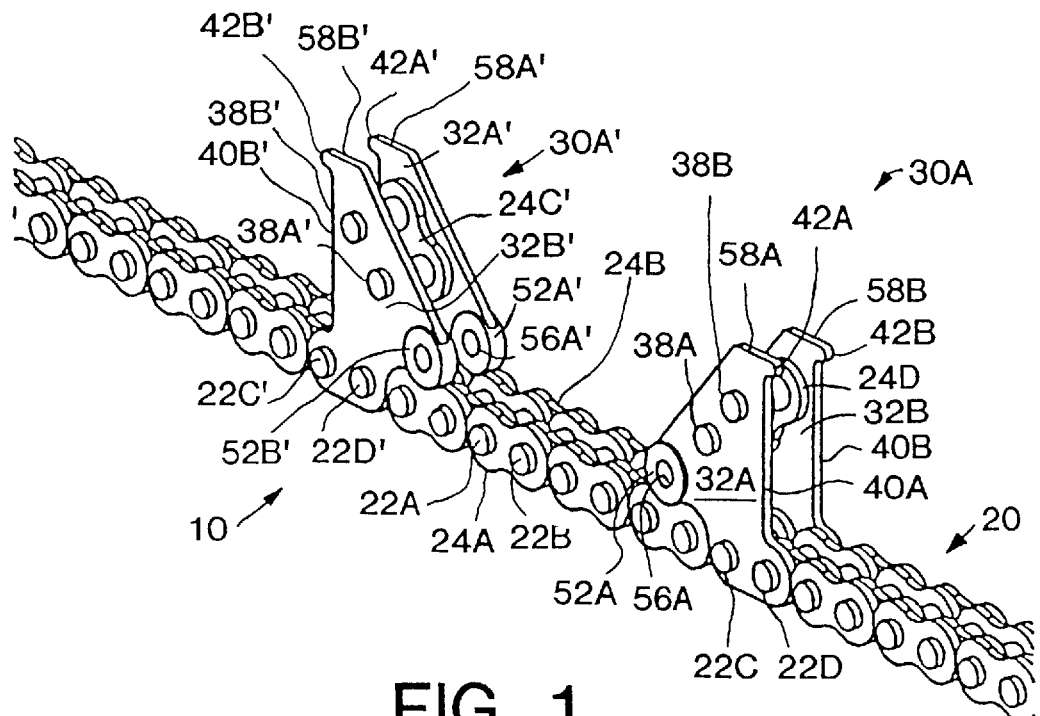
FIG. 1 of the drawings is a perspective view of one embodiment of a chain apparatus of the present invention.

FIG. 1 of the drawings illustrates a perspective view of a portion of one embodiment of chain apparatus 10. As shown, chain apparatus 10 comprises a plastic chain generally designated 20 comprising a series of substantially parallel rollers, such as rollers 22A and 22B, maintained in a spaced-apart relationship by a series of interconnected link plates such as link plates 24A and 24B pivotally attached to opposing ends of rollers 22A and 22B, respectively. As with conventional chain structures, each link plate of chain 20 defines a pair of spaced-apart apertures therethrough and is pivotally attached to a pair of adjacent rollers by one end of each roller passing through one of the apertures of the link plate and being maintained in such position. The end of each roller is preferably of a slightly larger diameter than that of the apertures of each link plate so that the roller end can be snapped or otherwise suitably fastened through the aperture to maintain the roller end in a pivotal attachment to the link plate. The link plates are positioned on opposing ends of the rollers and overlap one another so that each roller is actually pivotally attached to two link plates on each end thereof by each roller passing through one of the apertures defined by each of the two overlapping link plates such that the link plates are thereby interconnected as shown in FIG. 1.

Although chain 20 can be constructed of any plastic material suitable and desirable for optimal effectiveness and life during high-speed media processing, it has been found that the use of dissimilar materials for the rollers and the link plates greatly improves the wear characteristics of both the rollers and link plates. Specifically, it has been found to be greatly advantageous according to this invention that either the rollers or the link plates be constructed of a material consisting of a Nylon 6/6 resin filled with PTFE and silicon lubricant, and the other of the rollers or the link plates be constructed of a material consisting of a Nylon 6/6 resin filled with Aramid fibers and lubricated with PTFE. LNP Lubricomp RL-4540, available from LNP Engineering Plastics Inc. of Exton, Pa., is a material consisting of a Nylon 6/6 resin filled with PTFE and silicon lubricant and is suitable as the material for either the rollers or link plates. Additionally, LNP Lubricomp RAL-4022, also available from LNP Plastics, is a material consisting of a Nylon 6/6 resin filled with Aramid fibers and lubricated with PTFE and is suitable as a material for either the rollers or the link plates.

Chain 20 can be attached around and operatively engage one or more sprockets or gears for rotationally driving chain 20 at high accelerations and high speeds during high-speed media processing. The plastic material of construction of chain 20 advantageously allows chain 20 to be lightweight, durable, manufactured with low cost, and have a desirable ability for accurately tracking on gears utilized to drive chain 20. It has been found that chain 20 is light enough that it can be driven at high acceleration (85 m/s$^2$) to a high speed(2.5 m/s) with a NEMA size 34 single stack step motor in open-loop control. It has also been found that chain 20 can have a life of at least approximately forty (40) million stop-and-go cycles when utilized during high-speed media processing.

When used for causing media to be conveyed, chain apparatus 10 includes one or more push members attached to chain 20, such as push members generally designated 30A and 30A' and shown in FIG. 1, although it is envisioned according to this invention and can be appreciated by those of skill in the art of high-speed media processing that chain apparatus 10 can be advantageously used in a high-speed media processing apparatus without any type of push member thereon for conveying media, such as, for example, for simply causing another sprocket or gear and shaft attached thereto to rotate. Each push member is mounted onto chain 20 for engaging and conveying media in a predetermined direction during high-speed media processing and actually functions as a link for chain 20. Push members 30A and 30A' are shown in FIG. 1 attached to chain 20 such that they face opposite directions, and push members 30A and 30A' are therefore adapted to convey media in such opposite directions. It is envisioned, however, according to this invention that any suitable number of push members can be attached to chain 20 for use during high-speed media processing and that any suitable orientation and spacing of the push members on chain 20 can be used.

Each push member comprises opposing, substantially parallel push plates attached at least substantially perpendicularly to opposing ends of at least a pair of adjacent rollers of chain 20 so as to link the pair of rollers. Push member 30A of FIG. 1 is described herein, but it can be understood that push member 30A' is identical and includes correspondingly labeled components. Push member 30A comprises opposing parallel push plates 32A and 32B which are attached perpendicularly to opposing ends of rollers 22C and 22D so as to link rollers 22C and 22D in an identical or at least substantially identical manner that a link plate links the rollers.

Figure 2:
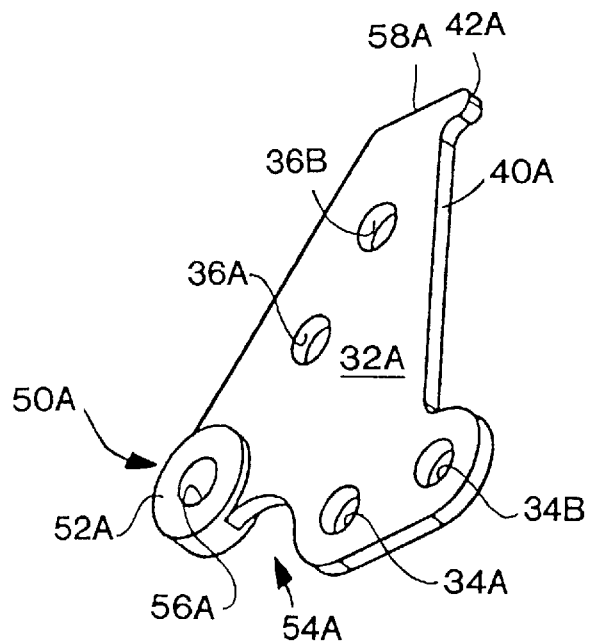
FIG. 2 of the drawings is an isolated perspective view of a push plate of a push member of the chain apparatus of the present invention.
Figure 3A:
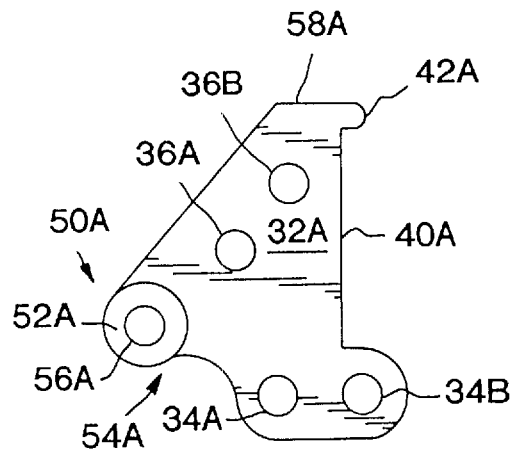
FIG. 3A of the drawings is a side elevation view of the push plate shown in FIG. 2.

FIGS. 2 and 3A of the drawings best illustrates push plate 32A of push member 30A, and push plate 32A is representative of the structure of each push plate of a push member in accordance with this invention. As shown, push plate 32A defines a pair of lower apertures 34A and 34B wherein each aperture 34A and 34B is adapted to receive an end of a roller of chain 20 in order to pivotally attach push plate 32A to one side of chain 20 whereby push plate 32A functions as a pivotal link plate for chain 20. In fact, a link can be removed from chain 20 and replaced with a push plate at a location where it is desirable to position the push plate and push member. As shown in FIG. 1, push plate 32A is attached to chain 20 by pivotal attachment to rollers 22C and 22D by the passage and maintenance of adjacent ends of rollers 22C and 22D through apertures 34A and 34B of push plate 32A.

Figure 3B:
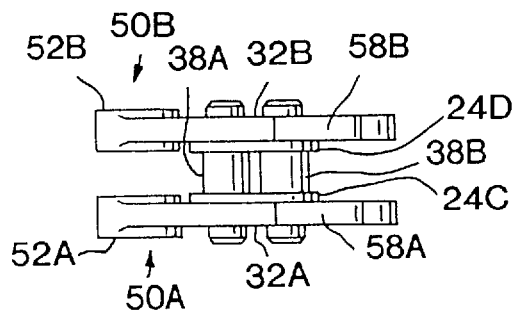
FIG. 3B of the drawings is a top plan view of a push member of the present invention.
Figure 3C:
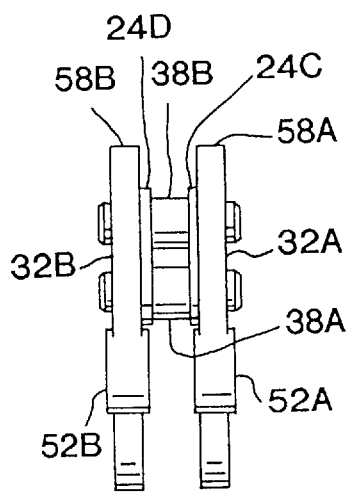
FIG. 3C of the drawings is a rear elevation view of a push member of the present invention.
Figure 3D:
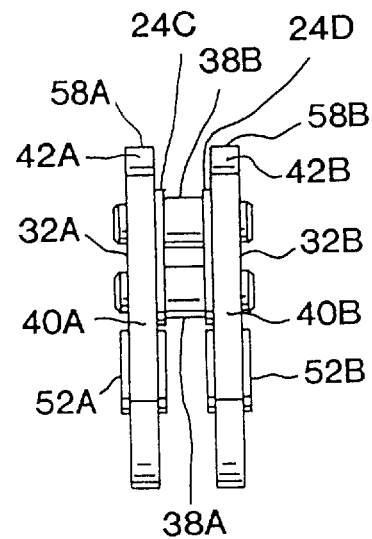
FIG. 3D of the drawings is a front elevation view of a push member of the present invention.

As shown in FIGS. 2 and 3A, push plate 32A also defines a pair of higher apertures 36A and 36B shown in a diagonal relationship as compared to the substantially horizontal relationship of lower apertures 34A and 34B. Apertures 36A and 36B are each adapted to receive a connection member which, for simplicity, can be the exact shape and size of a roller of chain 20 in order to fixedly connect opposing push plates of a push member. For example, as illustrated in FIG. 1, connection members 38A and 38B (see also FIGS. 3B, 3C, and 3D) have one end attached to push plate 32A by being fitted through apertures 36A and 36B, respectively, and the opposing ends of connection members 38A and 38B are likewise attached to push plate 32B. As partially shown in FIG. 1 and best shown in FIGS. 3B, 3C, and 3D, link plates 24C and 24D can optionally be utilized at the intersections of connecting members 38A and 38B with push plates 32A and 32B, respectively, to add stability to push member 30A. It can therefore be readily understood that although each push member as a whole can be pivotally attached to chain 20, the push plates of each push member are maintained in a fixed position with respect to one another at a lower location by direct attachment to chain 20 and at higher location by the use of connection members, such as connection members 38A and 38B.

The push plates of each push member preferably define flat engaging surfaces for engaging media to be conveyed during high-speed media processing with the engaging surfaces in a vertical position. Referring to FIGS. 1 and 2, push plates 32A and 32B therefore define media engaging surfaces 40A and 40B, respectively, which each extend perpendicularly upward from the area of attachment of the push plates 32A and 32B, respectively, to chain 20. When push member 30A is attached to chain 20 as shown in FIG. 1, media engaging surfaces 40A and 40B therefore extend in a parallel manner upwardly and perpendicularly from chain 20. In order to assist in media engaging surfaces maintaining engagement with media during high-speed media processing, media engaging surfaces 40A and 40B define forwardly extending upper ledges 42A and 42B, respectively, which assist in preventing media engaged by media engaging surfaces 40A and 40B from sliding thereabove.

The push plates of each push member form a laterally extending portion on a side of the push plate opposite to the media engaging surface such as laterally extending portion generally designated 50A of push plate 32A which is best illustrated in FIG. 2. Laterally extending portion 50A extends away from the area of push plate 32A defining apertures 34A and 34B at a higher horizontal level therefrom and terminates in corner 52A which can be an area of increased thickness and formed with rounded edges. The corner of each push plate can define an aperture therethrough such as aperture 56A defined through corner 52A of push plate 32A. Although not required, such an aperture can be used to reduce mold shrinkage during the manufacture of each push plate which facilitates the diametrical tolerance on the outside surfaces of the corner of each push plate. As shown in FIG. 2, push plate 32A extends diagonally between corner 52A and its flat top 58A.

Laterally extending portion 50A defines a lower support surface generally designated 54A adapted for at least generally matingly engaging the top surface of an adjacent link plate. When push plate 32A, as a part of push member 30A, engages media during high-speed media processing, the encounter can apply force to push member 30A such that laterally extending portion 50A of push member 30A will be pivotally pushed back and downwardly against the opposing link plates adjacent to push member 30A on a side opposite from the media engaging surfaces. In this manner, the laterally extending portions of push plates 32A and 32B can automatically provide support and stability to push member 30A when needed during high-speed media processing. The push member in accordance herewith can therefore be said to have a "kickstand" in the form of the laterally extending portions of its push plates in order to support the push member and prevent the push member from rotating too far in a direction opposite to the desired conveying direction when the push member encounters an impact load resulting from engaging and conveying media during high-speed media processing. This not only ensures accurate translation of the media at high speeds, but also greatly increases the longevity of the push member by limiting the angle that the link plates rotate about the rollers when the push member impacts media without causing any binding as the chain moves around the gears.

It can therefore be seen that each push member includes a pair of opposing push plates adapted to engage and convey media in a predetermined direction during high-speed media processing. As discussed further hereinbelow, the push members can be attached to chain 20 in predetermined positions and facing predetermined directions in order to convey media as desired during high-speed media processing.

FIG. 3 of the drawings illustrates an example of one embodiment of chain 20 utilized in a high-speed media processing apparatus. A motor M is utilized to drive belt B which engages and therefore rotates gear 60. Gear 60 engages chain 20 and therefore rotates chain 20 upon rotation of motor M. Motor M can be a servomotor with a closed-loop control or a step motor in open-loop control so that the motion of motor M, and therefore rotation of gear 60 and chain 20, can therefore be precisely controlled to rotate chain 20 in a clockwise direction and/or a counter-clockwise direction as desired. Chain 20 has push members 30A and 30A' attached thereto as shown in FIG. 1 but now positioned such that the same length of chain 20 separates push members 30A and 30A' on both sides of each push member and now both oriented to engage and convey media in a counter-clockwise direction during high-speed media processing.

Media to be conveyed can be advanced between either driven rollers 70A and 70B or 72A and 72B to consecutively position the media to be conveyed on tray 74 positioned above chain 20. Push members 30A and 30A' can then be cycled or rotated by motor M to alternatingly engage and convey media positioned on tray 74 in the counter-clockwise direction in which push members 30A and 30A' are adapted to convey media. The preferred structure of push members 30A and 30A' as described hereinabove advantageously enables each push member to be supported on chain 20 if necessary upon encountering the media. This example is merely one possible use provided for purposes of illustration only and is not intended to limit the scope of useful application of a chain apparatus in accordance with this invention.

It is therefore seen that the present invention provides a novel chain apparatus for rotation in a high-speed media processing apparatus to cause media to be conveyed. It can also be seen that the present invention provides a chain apparatus for high-speed media processing which can be driven at high acceleration and speed with minimal wear and long life. It can be appreciated that the present invention provides a chain apparatus including push members mounted on a chain whereby the push members are effective for conveying media in a predetermined direction and can be supported against adjacent portions of the chain for increased stability and longer life when encountering media to be conveyed. It can additionally be appreciated that, by the use of plastic chains, the drive components can also be made of lightweight plastic so that the total rotational inertia of the drive mechanism can be greatly reduced when compared to prior art mechanisms.

It will be understood that various details of the invention may be changed without departing from the scope of the invention. Furthermore, the foregoing description is for the purpose of illustration only, and not for the purpose of limitation, as the invention is defined by the following, appended claims.

What is claimed is:

1. A chain apparatus for rotation to cause media to be conveyed, said chain apparatus comprising:
   (a) a series of substantially parallel rollers maintained in a spaced-apart relationship by a series of interconnected link plates positioned on opposing ends of said rollers; and
   (b) at least one push member for engaging and conveying media, said push member comprising opposing substantially parallel push plates attached substantially perpendicularly to opposing ends of at least a pair of said rollers and linking said pair of rollers wherein each of said push plates forms a support surface for engaging an adjacent link plate such that said support surfaces can provide support to said push member when said push member encounters media.

2. A chain apparatus for rotation to cause media to be conveyed, said chain apparatus comprising:

(a) a series of substantially parallel rollers maintained in a spaced-apart relationship by a series of interconnected link plates positioned on opposing ends of said rollers; and (b) at least one push member for engaging and conveying media, said push member comprising opposing substantially parallel push plates attached substantially perpendicularly to opposing ends of at least a pair of said rollers and linking said pair of rollers wherein each of said push plates forms a support surface for engaging an adjacent link plate such that said support surfaces can provide support to said push member when said push member encounters media and wherein said push member defines substantially flat engaging surfaces for engaging media to be conveyed.

3. A chain apparatus for rotation to cause media to be conveyed, said chain apparatus comprising:

(a) a series of substantially parallel rollers maintained in a spaced-apart relationship by a series of interconnected link plates positioned on opposing ends of said rollers; and (b) at least one push member for engaging and conveying media, said push member comprising opposing substantially parallel push plates attached substantially perpendicularly to opposing ends of at least a pair of said rollers and linking said pair of rollers wherein each of said push plates forms a support surface for engaging an adjacent link plate such that said support surfaces can provide support to said push member when said push member encounters media and wherein each support surface of said push member is adapted to substantially matingly engage said adjacent link plate.

4. A chain apparatus for rotation to cause media to be conveyed, said chain apparatus comprising:

(a) a series of substantially parallel rollers maintained in a spaced-apart relationship by a series of interconnected link plates positioned on opposing ends of said rollers; and (b) at least one push member for engaging and conveying media, said push member comprising opposing substantially parallel push plates attached substantially perpendicularly to opposing ends of at least a pair of said rollers and linking said pair of rollers wherein each of said push plates forms a support surface for engaging an adjacent link plate such that said support surfaces can provide support to said push member when said push member encounters media and wherein each of said push plates forms a laterally extending portion which defines said support surface and wherein each extending portion extends over a roller adjacent said pair of rollers to which said push member is attached when each support surface engages said adjacent link plate.

5. In combination a media processing apparatus and at least one chain apparatus for engaging and conveying media, said chain apparatus comprising:

(a) a series of substantially parallel rollers maintained in a spaced-apart relationship by a series of interconnected link plates positioned on opposing ends of said rollers; and (b) at least one push member for engaging and conveying media, said push member comprising opposing substantially parallel push plates attached substantially perpendicularly to opposing ends of at least a pair of said rollers and linking said pair of rollers wherein each of said push plates forms a support surface for engaging an adjacent link plate such that said support surface can provide support to said push member when said push member encounters media.

6. In combination a media processing apparatus and at least one chain apparatus for engaging and conveying media, said chain apparatus comprising:

(a) a series of substantially parallel rollers maintained in a spaced-apart relationship by a series of interconnected link plates positioned on opposing ends of said rollers; and (b) at least one push member for engaging and conveying media, said push member comprising opposing substantially parallel push plates attached substantially perpendicularly to opposing ends of at least a pair of said rollers and linking said pair of rollers wherein each of said push plates forms a support surface for engaging an adjacent link plate such that said support surface can provide support to said push member when said push member encounters media and wherein said push member defines substantially flat engaging surfaces for engaging media to be conveyed.

7. In combination a media processing apparatus and at least one chain apparatus for engaging and conveying media, said chain apparatus comprising:

(a) a series of substantially parallel rollers maintained in a spaced-apart relationship by a series of interconnected link plates positioned on opposing ends of said rollers; and (b) at least one push member for engaging and conveying media, said push member comprising opposing substantially parallel push plates attached substantially perpendicularly to opposing ends of at least a pair of said rollers and linking said pair of rollers wherein each of said push plates forms a support surface for engaging an adjacent link plate such that said support surface can provide support to said push member when said push member encounters media and wherein each support surface of said push member is adapted to substantially matingly engage said adjacent link plate.

8. In combination a media processing apparatus and at least one chain apparatus for engaging and conveying media, said chain apparatus comprising:

(a) a series of substantially parallel rollers maintained in a spaced-apart relationship by a series of interconnected link plates positioned on opposing ends of said rollers; and (b) at least one push member for engaging and conveying media, said push member comprising opposing substantially parallel push plates attached substantially perpendicularly to opposing ends of at least a pair of said rollers and linking said pair of rollers wherein each of said push plates forms a support surface for engaging an adjacent link plate such that said support surface can provide support to said push member when said push member encounters media and wherein each of said push plates forms a laterally extending portion which defines said support surface and wherein each extending portion extends over a roller adjacent said pair of rollers to which said push member is attached when each support surface engages said adjacent link plate.

* * * * *